United States Patent Office 2,793,130
Patented May 21, 1957

2,793,130

PRESSURE MOLDED CEMENT PRODUCTS AND METHODS FOR PRODUCING SAME

Richard F. Shannon, Lancaster, and Robert H. Mitchell, New Concord, Ohio, assignors to Owens-Corning Fiberglas Corporation, a corporation of Delaware No Drawing. Application July 29, 1953, Serial No. 371,161

9 Claims. (Cl. 106—99)

This invention relates to the manufacture of products formed of Portland cement and other cementitious materials reinforced with glass fibers and it is an object of this invention to produce and to provide a method for producing glass fiber reinforced cementitious products having improved physical and mechanical properties such as increased hardness and density and higher impact and flexural strengths.

Glass fibers have been embodied as agents for reinforcement and improvement in flexure strength of cementitious compositions, as described in the copending applications Ser. No. 223,660, filed April 28, 1951, entitled "Reinforced Inorganic Molded Products," now U. S. Patent No. 2,781,274; Ser. No. 284,201, filed April 24, 1952, entitled "Plastic Molding Composition," now U. S. Patent No. 2,770,840; Ser. No. 284,202, filed April 24, 1952, entitled "Plastic Molding Composition," now abandoned, and Ser. No. 200,077, filed December 9, 1950, entitled "Fibrous Board and Method of Making the Same," now U. S. Patent No. 2,664,606, but fabrication of glass fibers into finished cementitious products has been limited chiefly to processes wherein little, if any, pressure is employed in forming. This is because the sharp cement particles of the cement and, apparently, the glass fibers themselves causes disintegration of the glass fibers under molding pressure. As a result insufficient glass fibers of reinforcing length remain in the molded product and the expected improvements in strength properties and flexure are seldom, if ever, achieved. In fact the strength properties remain at the level secured in the absence of glass fiber in the cementitious product.

It is an object of this invention to provide a method for achieving improvement in strength from the pressure molding of glass fiber reinforced cementitious products and it is a related object to provide means for preventing the disintegration of the glass fibers upon pressure molding when present in the cement slurry.

It has been found that disintegration and damage of the glass fibers when molded under pressure in combination with cementitious compositions can be alleviated to a great extent if the glass fiber surfaces are coated with a material which imparts a cushioning reaction to protect the glass. The desired cushioning action which enables molding of glass fiber reinforced cementitious compositions at pressures as high as 2000 pounds per square inch without excessive damage has been achieved when the glass fiber surfaces are coated in advance of molding with organic sizes formulated of such materials as dextrinized starch, gelatin, casein, carbohydrates, and other colloids, or phenol formaldehyde resins, urea formaldehyde resins, melamine formaldehyde resins, polyester resins and the like thermosetting materials or polyalkyl acrylates and the like thermoplastic resins, in solvent solution or in aqueous emulsion, and without but preferably with lubricants such as vegetable and mineral oils, sulfonated oils, fatty acids, fatty acid esters and the like, and which also contain wetting agents.

The following are representative of formulations which may be applied to glass fibers for protection against destruction during pressure molding of cementitious materials:

Example 1

8.0 percent partially dextrinized starch
2.0 percent hydrogenated vegetable oil
0.3 percent non-ionic emulsifying agent (polyglycol esters of fatty acids)
0.6 percent cationic softener (tetraethylene pentamine stearic acid condensate solubilized with acetic acid)
89.1 percent water

Example 2

3.0 percent polyvinyl acetate plasticized with 20–30 percent dibutyl phthalate
2.0 percent methacrylate chromic chloride
0.4 percent pelargonate amide solubilized with acetic acid
94.6 percent water

Example 3

Synthetic A49 alkyd, manufactured by Hercules Powder Company of Wilmington, Delaware These compositions may be applied to the glass fiber surfaces as a size in conjunction with the operation for forming the fibers by rapid attenuation of molten streams of glass, as described in Biefeld Patent No. 2,392,805, or by other conventional coating means. The amount present on the surfaces is not critical as long as the glass fiber surfaces are covered substantially throughout their lengths.

When the glass fibers have been pretreated in the manner described to embody a cushioning agent for protecting the glass fibers against destruction by abrasion when molded with cementitious materials, pressure molding can, for the first time, be used successfully to produce dense cementitious products reinforced with glass fibers to provide a marked improvement in strength and flexure. Where before a loss in strength resulted when cementitious compositions reinforced with glass fibers were molded under pressure, marked improvements in strength are secured when the glass fibers have been pretreated in accordance with the practice of this invention. Where before little improvement in strength resulted from the pressure molding of cementitious materials, when glass fibers treated in accordance with the practice of this invention are incorporated in an equivalent cementitious composition, products molded under pressure have been found to have strength properties increased four times over that secured without pressure and many more times over that secured by pressure molding with untreated glass fibers present as a reinforcement.

To the present, the conditions responsible for this marked improvement in strength and flexure resulting from pressure molding of glass fiber reinforced cementitious compositions has not been determined. Since comparable results have not been secured merely by the addition of such organic coating compositions or resinous coating materials as ingredients in the cement slurry, it is believed that the improvements in strength flows more directly from the compressive forces which bring about more intimate contact between the cement particles themselves and between the cement particles and the glass fibers and also because of the greater number of such points of contact forced between the cement particles and the glass fibers whereby greater utilization is made of the high strength properties of the glass fibers present.

While the organic coatings on the glass fiber surfaces appear to impart sufficient cushioning action to protect the glass fibers from damage and destruction thereby, for the first time, to permit the successful use of high pressure in molding cementitious compositions, the organic materials on the glass fiber surfaces are incapable of developing an adequate bonding relation with the highly hydrophilic surfaces of the glass fibers and are therefore incapable of providing maximum utilization of the high strength of the glass fibers for reinforcement of the cementitious products. Although increased strength is secured, to an extent, by increasing the concentration of fibers, the amount of glass fibers of reinforcing lengths (¼–4 inches) which can be incorporated into a slurry without destroying the plastic flow necessary for molding is limited, usually to a maximum of about 8–12 percent. Very often only 5 percent or less glass fibers on the weight basis can be incorporated before the cement slurry becomes too stiff to handle.

Thus it is another object of this invention to produce treated glass fibers and to provide a method for producing same in advance of their combination with cements to protect the glass fibers from destruction in response to molding under pressure and also to improve the bonding relation between the glass fibers and the cementitious materials with which the glass fibers are combined for molding into products, with or without pressure, to enable more complete utilization of the strength properties of the glass fibers incorporated as a reinforcement and flexibilizing agent and it is a related object to produce new and improved glass fiber reinforced cementitious products embodying same.

In accordance with the further practice of this invention, the desired improvement in the bonding relation between the glass fiber surfaces and the cementitious materials and the desired cushioning action to minimize destruction of the glass fibers during molding under pressure is achieved by the treatment of the glass fibers to form an inorganic coating in situ on the glass fiber surfaces by reaction of a polyvalent metal salt and a water soluble oxide or hydroxide to form an insoluble reaction product, probably the corresponding polyvalent metal hydroxide, which functions both as an anchoring and as a cushioning agent.

The following will demonstrate the practice of this invention:

*Example 4*

Upon attenuation of the glass fiber filaments from molten streams of glass, as by the process described in the Biefeld Patent No. 2,392,805, the filaments of glass fibers are coated in forming with a 3 percent aqueous solution of aluminum chloride. Soon thereafter, and preferably while the fibers are still wet with the solution of the aluminum chloride, the surface is wet with a 1 percent solution of ammonium hydroxide. A reaction product immediately develops in the form of a water insoluble gelatinous coating which is believed to be a form of aluminum hydroxide. The reaction product remains strongly bonded to the glass fiber surfaces. While elevated temperatures, such as up to 300–350° F. may be used to accelerate drying, it will be sufficient if glass fibers with the reaction product formed in situ as a coating on the surfaces thereof are allowed to dry slowly in air. The glass fibers having the reaction product on the surface are able to resist destruction and deterioration when present in cementitious compositions molded under pressure and the reaction product formed in situ on the glass fiber surfaces functions excellently as an anchoring agent strongly to bond the cement particles to the glass fiber surfaces.

Instead of carrying out the described treatments to form the reaction product in situ on glass fibers in connection with the glass fiber forming steps, the treatments to form the reaction product on the glass fiber surfaces may be carried out with glass fibers which have already been formed, with or without the removal of the original size applied to the glass fiber surfaces, such as previously described. Similarly the reaction products may be formed on staple glass fibers by wetting the glass fibers first with the water soluble polyvalent metal salt and then with the soluble oxide or hydroxide to react with the metal salt in forming the insoluble polyvalent metal hydroxide or other reaction product.

It is preferred also to make use of a salt of a polyvalent metal which tends to form a gelatinous type of water insoluble hydroxide such as the salts of aluminum, tin, and zirconium. It is best to make use of the polyvalent metal salts as the chloride or iodide or phosphates but the water soluble acetates, formates and the like may also be used if desired. Though the results are not equivalent, water soluble salts of the bivalent metals such as of lead, copper, and magnesium or the like, may be used either as the chlorides or iodides but preferably as the acetates, formates, or phosphates.

Because of the simplicity in use and because of the ability to eliminate excess by vaporization, it is preferred to make use of ammonium hydroxide as the component for reaction with the polyvalent metal to form the desired reaction product in situ on the glass fiber surfaces. Instead of ammonium hydroxide other inorganic ammonium basic salts capable of releasing hydroxyl groups in solution may be used. Similarly other organic amine bases may be used such as morpholine, triethanolamine, diethanolamine or other volatilizable organic base amine compounds. While it is possible to achieve formation of the desired reaction products with other water soluble oxides or hydroxides, use cannot be made of the sodium, potassium or lithium hydroxides on the glass fiber surfaces.

The concentrations of the solutions applied for reaction on the glass fiber surfaces is not critical as long as the reaction product on the glass fiber surfaces is present in amounts ranging from about ½ to about 10 percent by weight based on the glass fibers. For this purpose, solutions may be used containing the metal salt in concentrations ranging from ½ to 10 percent by weight. The ammonium hydroxide or equivalent material can be provided in concentrations of ½ to 10 percent by weight, and preferably in concentrations within the range of ½–3 percent by weight. In the alternative, the insolubilizing agent may be supplied in the form of a vapor of ammonia or other base amine, as by passing the fiber wet with a solution of the polyvalent metal through a chamber in which ammonia is vaporized.

When, for example, glass fibers are coated first with a 2 percent by weight solution of aluminum chloride ($AlCl_3.6H_2O$) and subsequently coated while wet with a 0.5 percent solution of ammonium hydroxide, a coating of the desired reaction product in amounts of about 1.27 percent by weight is formed on the glass fiber surfaces. A 4 percent solution of aluminum chloride gives a coating amounting to 2.25 percent by weight when the glass fibers are wet with a 0.5 percent solution of ammonium hydroxide and about a 3.5 percent pickup when wet with a 2.5 percent solution of ammonium hydroxide and about a 3.5 percent pickup when wet with an 8.5 percent solution of ammonium hydroxide.

*Example 5*

Continuous glass fibers sized with a composition of Example 2 are wet with a 4 percent solution of aluminum chloride. While still wet, the fibers are passed through a bath containing a 4 percent solution of ammonium hydroxide and then air dried. When cut to 1 inch lengths and incorporated in amounts of about 3 percent by weight with 10 percent by weight asbestos into a Portland cement slurry and then molded under 1000 pounds per square inch pressure, a product having a flexure strength of 4000 pounds per square inch is secured. This is about three to four times greater than the strength secured in the absence of a coating of the reaction product formed in situ on the glass fiber surfaces and over four times greater than a similar cementitious product molded under similar pressure but without pretreatment of the glass fibers.

Asbestos is usually incorporated with the glass fibers in compositions of the type described to permit the distribution of glass fibers in the cement slurry without balling, as described in the copending application Ser. No. 263,998, filed December 28, 1951, now U. S. Patent No. 2,738,285. The amount of asbestos and the need for asbestos depends greatly upon the flexibility or limpness of the glass fibers. When less than 3 percent glass fibers are incorporated as a reinforcement, little, if any, asbestos is used. When present in amounts greater than 3 percent and up to 10–12 percent, ordinarily 10 percent or more of asbestos is used.

While excellent results have been secured with combinations of the glass fibers treated in the manner described and Portland cement, the reaction products formed on the glass fiber surfaces in accordance with the practice of this invention provides an improved bonding relation and cushioning effect when used in combination with other cementitious materials of the type gypsum, magnesium-oxychloride, magnesium-oxysulphate, and the like.

It will be understood that other changes may be made with respect to the formulations, methods of application and treatment, without departing from the spirit of the invention, especially as defined in the following claims.

What is claimed is:

1. A pressure molded product of an inorganic cement comprising a cured inorganic cement as a continuous phase, glass fibers dispersed throughout the cement phase as a reinforcement and a coating on the glass fiber surfaces in the form of a water insoluble product of the reaction of a salt of a polyvalent metal in solution and a water soluble compound other than an alkali metal base capable of releasing hydroxy groups for reaction in situ on the glass fiber surfaces.

2. A pressure molded product of an inorganic cement comprising a matrix of a cured inorganic cement, glass fibers dispersed throughout the matrix of the cured cement as a reinforcement and a coating on the surfaces of the glass fibers in the form of a water insoluble product which is formed in situ on the glass fiber surfaces by reaction of a salt of a polyvalent metal in solution and a base other than an alkali metal base capable of releasing hydroxy groups and which functions as an anchoring and a protective agent.

3. A pressure molded product of an inorganic cement comprising a matrix of a cured inorganic cement, glass fibers dispersed throughout the matrix of the cured cement as a reinforcement and a coating on the surfaces of the glass fibers in the form of a water insoluble polyvalent metal hydroxide.

4. A cement composition comprising a matrix of a cured inorganic cement, glass fibers dispersed throughout the matrix of the cured cement as a reinforcement and a coating on the surfaces of the glass fibers in the form of a water insoluble coating formed in situ on the glass fiber surfaces by the reaction of a salt of a polyvalent metal in solution and a hydroxy group made available in an ionized state from a base other than an alkali metal base for reaction with the polyvalent metal to form the water insoluble reaction product.

5. A cement composition comprising a matrix of a cured inorganic cement, glass fibers dispersed throughout the matrix of the cured cement as a reinforcement and a coating on the surfaces of the glass fibers in the form of a water insoluble coating formed in situ on the glass fiber surfaces by reaction of a salt of a polyvalent metal in solution and ammonium hydroxide.

6. A cement composition comprising a matrix of a cured inorganic cement, glass fibers dispersed throughout the matrix of the cured cement as a reinforcement and a coating on the surfaces of the glass fibers in the form of a water insoluble polyvalent metal hydroxide coating on the glass fiber surfaces to increase the bonding relation between the glass fiber surfaces and the cement particles.

7. In the method of treating glass fibers for use in combination to reinforce an inorganic cement product wherein the glass fibers are incorporated into a cement slurry and then molded while the inorganic cement is advanced to a cured stage, the improvement which comprises coating the glass fibers prior to combination with the inorganic cement by wetting the surfaces of the glass fibers with an aqueous solution of a water soluble salt of a polyvalent metal, introducing hydroxy ions from a base other than an alkali metal base onto the fibers wet with the solution of the salt of the polyvalent metal for reaction in situ on the glass fiber surfaces to form a water insoluble reaction product which protects the fibers and increases the bonding relation between the glass fiber surfaces and the inorganic cement.

8. In the method of manufacturing a reinforced molded product of inorganic cement wherein the glass fibers are incorporated as a reinforcement into the cement slurry and which is molded while the cement material is advanced to a cured stage, the improvement comprising coating the glass fibers prior to combination with the inorganic cement by wetting the surfaces of the glass fibers with an aqueous solution of a water soluble salt of a polyvalent metal capable of forming gelatinous hydroxides, treating the surfaces of the fibers wet with the solution of the salt of the polyvalent metal with a material other than an alkali metal base capable of releasing hydroxy ions for reaction in situ on the glass fiber surfaces to form a water insoluble reaction product which protects the fibers and increases the bonding relation between the glass fiber surfaces and the inorganic cement.

9. In the method of manufacturing a reinforced molded product of inorganic cement wherein glass fibers are incorporated as a reinforcement into a cement slurry and which is molded while the cement material is advanced to a cured stage, the improvement comprising coating the glass fibers prior to combination with the inorganic cement by wetting the surfaces of the glass fibers with an aqueous solution of a water soluble salt of a polyvalent metal, applying a solution of ammonium hydroxide to the wet surfaces of the glass fibers for reaction in situ on the glass fiber surfaces to form a water insoluble reaction product, and then drying the coating on the glass fiber surfaces.

References Cited in the file of this patent

UNITED STATES PATENTS

| | | |
|---|---|---|
| 2,085,129 | Stowener | June 29, 1937 |
| 2,246,537 | Rembert | June 24, 1941 |
| 2,315,892 | Booth | Apr. 6, 1943 |
| 2,323,387 | Edelstein | July 6, 1943 |
| 2,361,830 | Edelstein | Oct. 31, 1944 |
| 2,373,914 | Quinn | Apr. 17, 1945 |
| 2,392,805 | Biefeld | Jan. 15, 1946 |
| 2,425,883 | Jackson | Aug. 19, 1947 |
| 2,451,805 | Callinan | Oct. 19, 1948 |
| 2,511,472 | Kmecik | June 13, 1950 |
| 2,531,571 | Hyde | Nov. 28, 1950 |
| 2,610,957 | Steinman et al. | Sept. 16, 1952 |
| 2,661,288 | Barbaras | Dec. 1, 1953 |
| 2,671,744 | Biefeld | Mar. 9, 1954 |